United States Patent
Zhou et al.

(10) Patent No.: US 7,440,163 B1
(45) Date of Patent: Oct. 21, 2008

(54) COMPACT PASSIVE MODULE FOR ERBIUM AND OTHER FIBER AMPLIFIERS

(75) Inventors: Andy F. Zhou, Fremont, CA (US); Daoyi Wang, Sunnyvale, CA (US)

(73) Assignee: Alliance Fiber Optic Products, Inc., Sunnyvale, CA (US)

( * ) Notice: Subject to any disclaimer, the term of this patent is extended or adjusted under 35 U.S.C. 154(b) by 0 days.

(21) Appl. No.: 11/562,980

(22) Filed: Nov. 22, 2006

(51) Int. Cl.
*H04B 10/17* (2006.01)
*H04B 10/12* (2006.01)

(52) U.S. Cl. .................................. 359/333; 359/337.1

(58) Field of Classification Search ................ 359/333, 359/337.1
See application file for complete search history.

(56) References Cited

U.S. PATENT DOCUMENTS

| | | | |
|---|---|---|---|
| 5,859,717 A | 1/1999 | Scobey | |
| 6,144,792 A * | 11/2000 | Kim et al. | 385/135 |
| 6,236,496 B1 * | 5/2001 | Yamada et al. | 359/341.33 |
| 6,560,379 B2 * | 5/2003 | Ikeda et al. | 385/11 |
| 6,806,967 B2 * | 10/2004 | Atia et al. | 356/519 |
| 7,013,069 B1 * | 3/2006 | He et al. | 385/47 |
| 7,044,660 B2 | 5/2006 | Pan et al. | |
| 7,224,865 B1 * | 5/2007 | Wang et al. | 385/34 |
| 2001/0012147 A1 * | 8/2001 | Lutz et al. | 359/337.2 |
| 2003/0002771 A1 * | 1/2003 | Cheng et al. | 385/14 |
| 2003/0067645 A1 * | 4/2003 | Ibsen et al | 359/124 |
| 2003/0108297 A1 * | 6/2003 | Lee | 385/47 |
| 2003/0185514 A1 * | 10/2003 | Bendett et al. | 385/48 |
| 2004/0076436 A1 * | 4/2004 | Bergmann et al. | 398/82 |
| 2006/0001949 A1 * | 1/2006 | Sakaguchi et al. | 359/333 |

* cited by examiner

*Primary Examiner*—Eric Bolda
(74) *Attorney, Agent, or Firm*—Joe Zheng

(57) ABSTRACT

Techniques for designing optical devices with passive components for erbium and other doped fiber amplifiers are disclosed. In one aspect, all passive components needed to construct optical amplifiers of both single and multiple-stage forward or backward pumps are integrated without extensively using optical fiber splicing joints. One of the features is to use free-space optics for inter-function cascades among various necessary functions, such as one or more tap couplings, WDM filtering to multiplex (Mux) or de-multiplex (Demux) pump and signal lights, gain-flattening, pump isolation and even performing Mux and Demux of different polarizations.

11 Claims, 5 Drawing Sheets

COMPACT PASSIVE MODULE FOR ERBIUM AND OTHER FIBER AMPLIFIERS

BACKGROUND OF THE INVENTION

1. Field of the Invention

The invention is generally related to the area of optical devices. In particular, the present invention is related to compact passive modules for erbium and other doped fiber amplifiers.

2. The Background of Related Art

EDFA (erbium-doped fiber amplifier) is an optical repeater device that is used to boost the intensity of optical signals being carried through a fiber optic communications system. An optical fiber is doped with the rare earth element erbium so that the glass fiber can absorb light at one frequency and emit light at another frequency. An external semiconductor (or pump) laser couples light into the fiber at infrared wavelengths of either 980 or 1480 nanometers. This action excites the erbium atoms. Additional optical signals at wavelengths between 1530 and 1620 nanometers enter the fiber and stimulate the excited erbium atoms to emit photons at the same wavelength as the incoming signal. This action amplifies a weak optical signal to a higher power, effecting a boost in the signal strength.

FIG. 1 shows an exemplary implementation 100 of using an EDFA. A signal (e.g., around 1550 nanometers) 102 is coupled to a tap coupler 104 that takes a sample of the signal 102 to be tested via a photo-diode 106. The signal 102 goes through an isolator 108 that allows a light beam to go one way. A Wavelength Division Multiplexing (WDM) filter 110 is provided to couple an external laser (e.g., at 980 nanometers) into the signal 102 that then goes through an EDFA 114 to be amplified. A second WDM 110 is provided at the same time to couple an external laser (e.g., at 1480 nanometers) into the signal for amplification in the EDFA 114. The amplified signal goes through another isolator 118 before it reaches a gain flattening filter (GFF) 120 which the signal is adjusted. Another tap coupler 122 is provided to take a sample of the signal for test via a photo-diode 124. The amplified signal is coupled out by a collimator 126.

In summary, the implementation 100 of FIG. 1 includes many components. In addition to the erbium doped fiber amplifier, there are a 980 nm pump laser and a 1480 nm reverse pump laser, three tap couplers with photo-diodes for input and output power monitoring, a 980 nm WDM filter and a 1480 nm WDM filter for multiplexing the pump and amplifying laser signals, a GFF for gain curve correction, and two isolators. It can be noticed, however, that there are 12 inter-component fiber splicing joints that are needed to connect all the components, which requires extensive laboring to put the fiber splicing joints together with the components. Further, it may be observed that the implementation can be expensive in cost and fragile in operation.

Accordingly, there is a great need for different techniques to realize optical amplifiers. Such devices so designed are amenable to small footprint, broad operating wavelength range, enhanced impact performance, lower cost packaging, and easier manufacturing process.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

In general, the present invention pertains to compact passive modules for erbium and other doped fiber amplifiers. According to one aspect of the present invention, all passive components needed to construct optical amplifiers of both single and multiple-stage forward or backward pumps are integrated without extensively using optical fiber splicing joints. One of the features in the present invention is to use free-space optics for inter-function cascades among various necessary functions, such as one or more tap couplings, WDM filtering to multiplex (Mux) or de-multiplex (Demux) pump and signal lights, gain-flattening, pump isolation and even performing Mux and Demux of different polarizations.

There are at least three distinguished advantages, benefits and features in the present invention. One of them is the elimination of various unnecessary I/O fibers that may clog the space and risk the splice breakage. Another one is the elimination of lenses used to couple light from and into these fibers, thereby to reduce the inter-component insertion loss and component cost. Still another one is the reduction of passive components based integration complexity and required space so that the all passive components can be integrated on a common and compact substrate.

The current invention addresses the integration issue of isolators, WDM filters and taps with GFF and detectors. It also addresses the integration issue of multi-staged pump passive components into a single optical unit. In addition, it goes beyond just a fiber amplifier passive integration, the present invention offers a general platform for integrating multiple pumping and signal cleaning optics, and provides the performance with much improved optical performance parameters like insertion loss, return loss, maximum laser power level, better reliability through the free space connection of these functional sub-components.

For simplicity, a group of selected wavelengths or channels will be deemed or described as a selected wavelength or channel hereinafter. The present invention may be implemented in many ways as a subsystem, a device or a method. According to one embodiment, the present invention is an optical apparatus comprising: a first WDM filter that couples a signal and a laser of a first wavelength to an erbium-doped fiber amplifier, and a second WDM filter that couples a pump laser of a second wavelength to the erbium-doped fiber amplifier where the signal is amplified. The apparatus further comprises a gain flattening filter (GFF) to enhance the amplified signal. Various collimators are provided to move a signal from one component to another. Taps are also provided to monitor the signal.

One of the objects, features, advantages of the present invention is to provide optical devices that are amenable to small footprint, broad operating wavelength range, enhanced impact performance, lower cost packaging, and easier manufacturing process.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE PREFERRED EMBODIMENT

Figure 1:
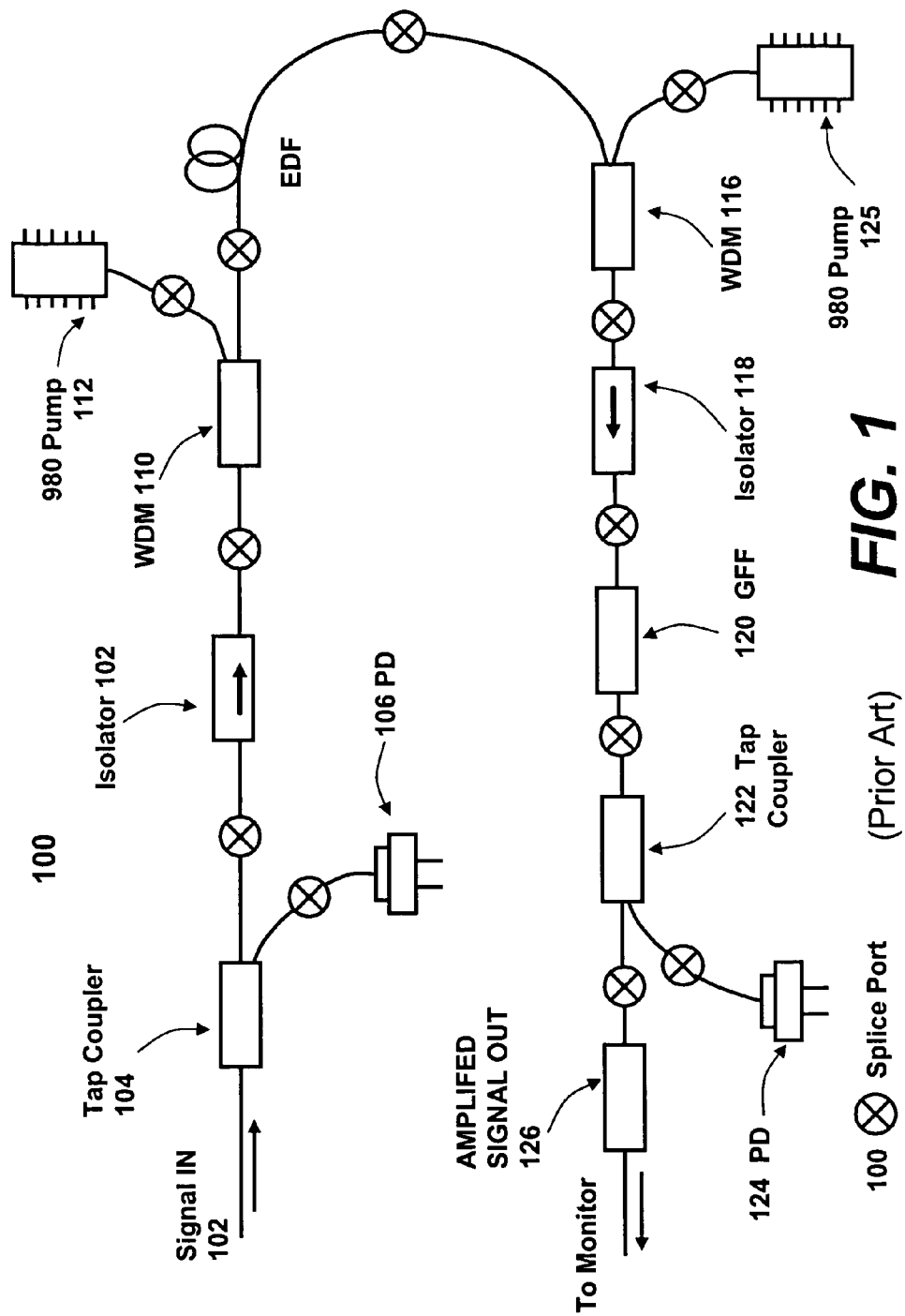
FIG. 1 shows an exemplary implementation of using an EDFA.

The detailed description of the present invention is presented largely in terms of procedures, steps, logic blocks, processing, or other symbolic representations that directly or indirectly resemble the operations of optical devices or systems that can be used in optical networks. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

Referring now to the drawings, in which like numerals refer to like parts throughout the several views. FIG. 2 shows one exemplary implementation 200 according to one embodiment of the present invention. The implementation 200 integrates a series of tap 202, photo-detector 204, isolator 206, and WDM filter 208 together without using any optical filter splicing joints. From one perspective, the implementation 200 functions the upper half of the implementation of FIG. 1 but is through free-space optics under collimated beam conditions. It should be noted that the tap 202 and the WDM filter 208 are used for both transmission and reflection at an angle and such an angle can range from a few degrees to close to 90 degrees depending on the filter designs. The isolator 206, on the other hand, is used as a transmissive component. It can be observed that the individual segments of fibers are now replaced by collimated beams in free-space, thus significantly reducing insertion loss. As a result, three collimators are used in FIG. 2.

Figure 2:
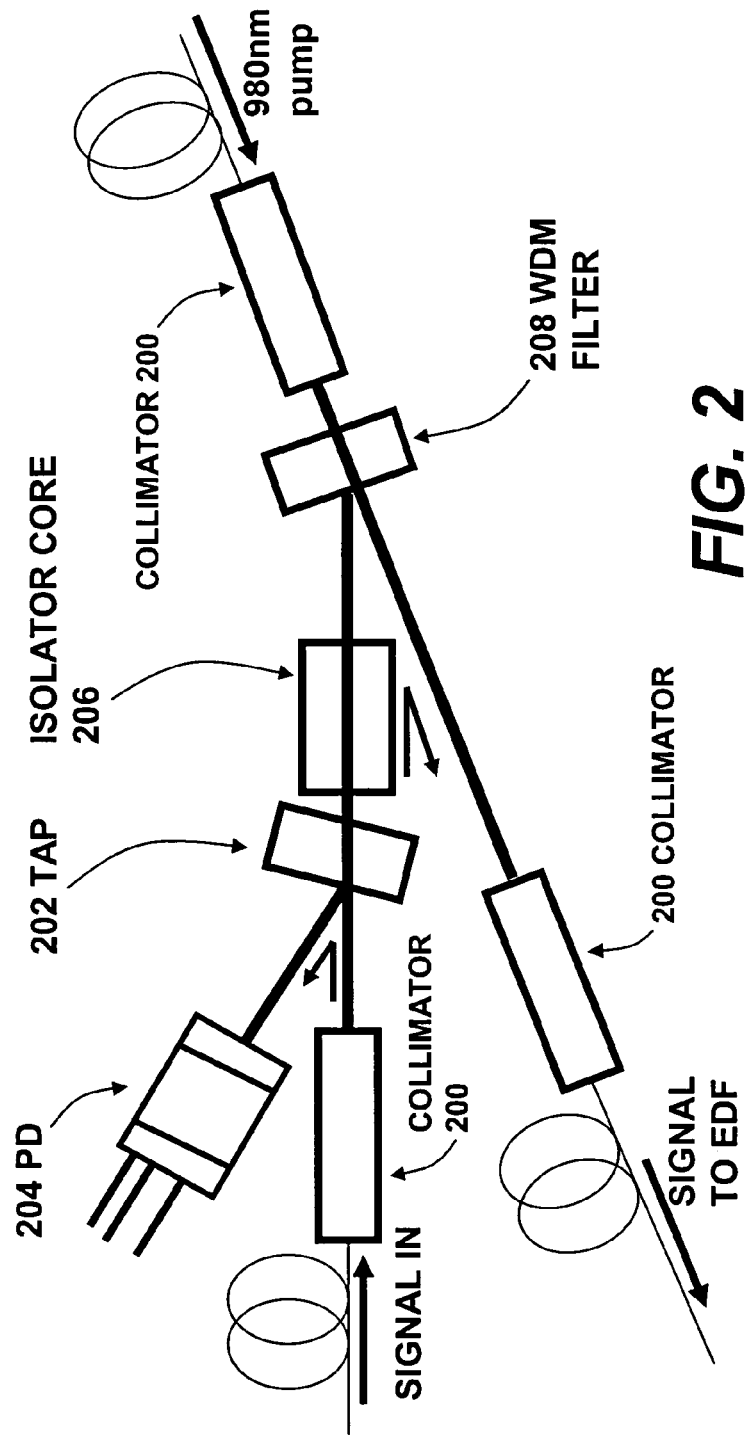
FIG. 2 shows one exemplary implementation according to one embodiment of the present invention.
Figure 3:
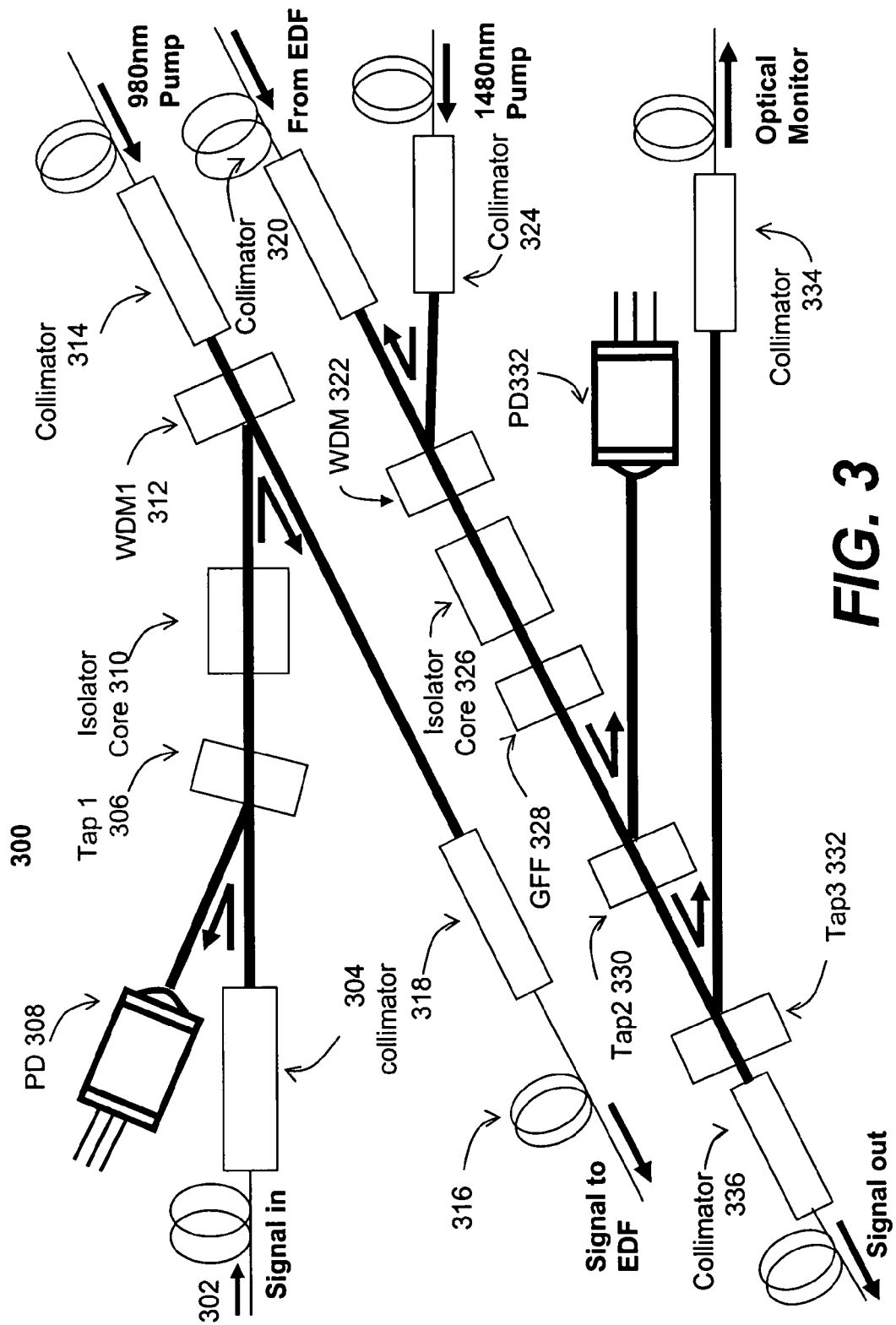
FIG. 3 shows a bottom portion of FIG. 1 realized differently in accordance with one embodiment of the present invention.

Similarly, the bottom portion of the FIG. 1 can also be realized differently in accordance with one embodiment of the present invention as shown in FIG. 3. The components as shown in the lower part in FIG. 1 can also be integrated without using any optical fiber slicing joints. Nevertheless, it should be pointed out that the integration in accordance with the present invention provides even more advantages because there is another component, a GFF, in the optical path. GFF, gain flattening filter, is used to compensate the gain spectrum after a light beam is pumped.

The exemplary implementation 300 of an optical amplified shown in FIG. 3 is in accordance with one embodiment of the present invention. A light beam 302, e.g., a band signal with a center wavelength at 1550 nm. The signal 302 is coupled to a tap 306 via a collimator 304. The tap 306 is positioned at an angle that a small reflection of the signal 302 is reflected to a photo-diode 308 for monitoring and the rest of the signals 302 goes through an isolator core 310. Those skilled in the art shall understand the difference between an optical isolator and an optical isolator core. One of the functions provided by the isolator core 310 is to ensure that a light beam goes one way.

A WDM 312 is provided to multiplex the signal with a 980 nm pump laser beam coupled in by a collimator 314. The multiplexed signal is then coupled to an EDF 316 (not shown) via a collimator 318 for amplification (thus first amplification). The once-amplified signal is coupled back in by a collimator 320 to be multiplexed by a WDM 322 with a 1480 nm pump laser beam coupled in by a collimator 324 for amplification in the EDF 316 again (thus second amplification). The twice-amplified signal is now coupled to a GFF 328 via an isolator 326. A portion of the twice-amplified signal is taped out by a tap 330 for test by a photo-diode 332. Another tap 332 is provided to monitor the signal via a collimator 334. The amplified light signal is eventually coupled out via a collimator 336.

It is noticed that the two pump lasers 1480 nm and 980 nm may be switched in place. Also it is noticed that the implementation 300 shows that one pump laser is backward and the other pump laser is forward. As used herein, a "forward" pump laser is a laser (e.g., the 980 nm pump laser in FIG. 3) to be merged with a signal light beam along a DWM filter while a "backward" pump laser is a laser (e.g., the 1480 nm pump laser in FIG. 3) to be merged with a signal light beam on reflection by a DWM filter. Given the detailed description herein, those skilled in the art may appreciate that two forward pump lasers or two backward pump lasers may be used as well.

Figure 4:
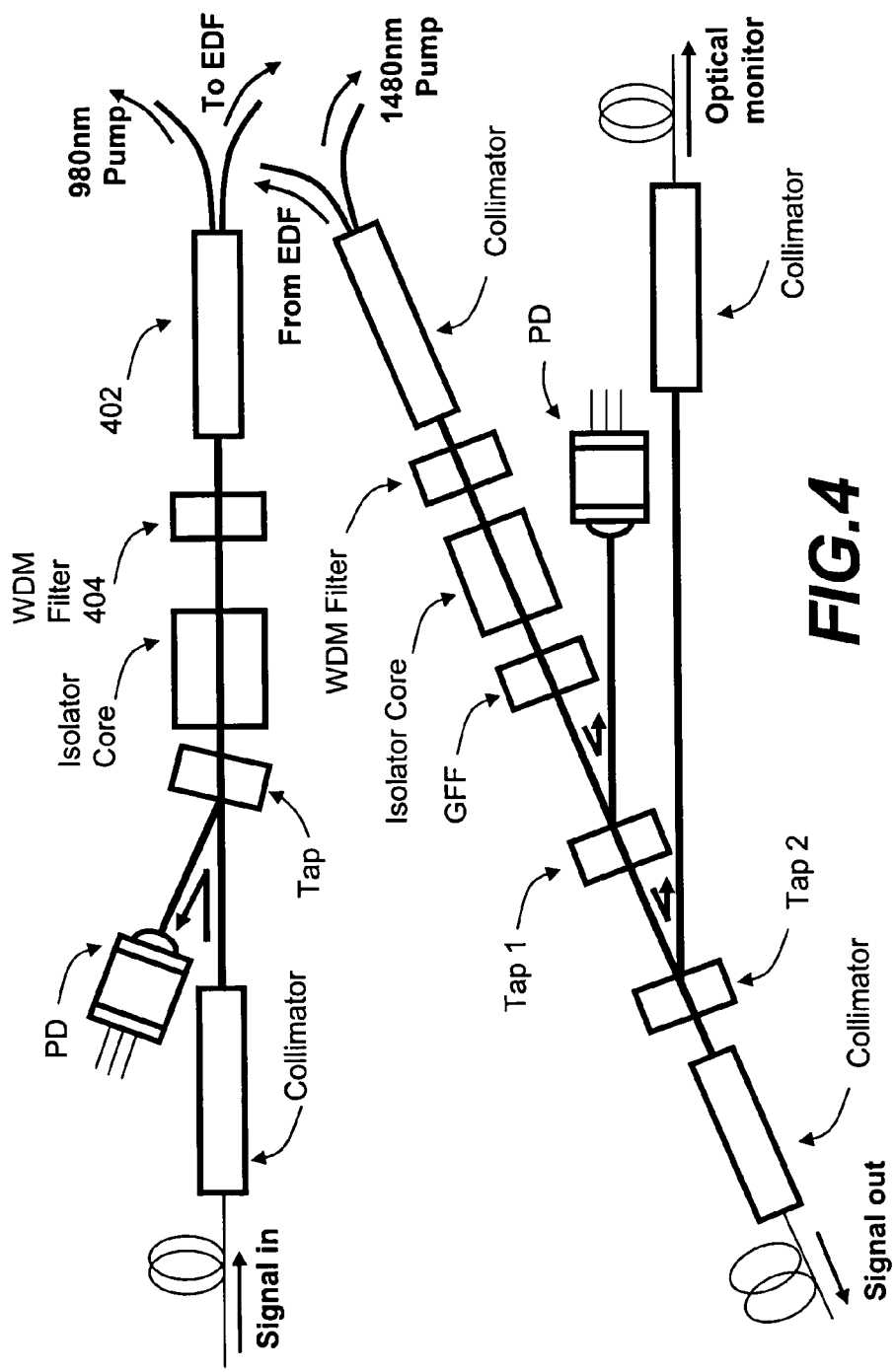
FIG. 4 shows that a dual-fiber collimator is used in one embodiment of the present invention.

To further reduce the size, a dual-fiber collimator 402 is used as shown in FIG. 4. The beams of two fibers share the same collimation lens. The WDM filter 404 and the collimator 402 can be bonded together with a tube structure or bonded to a common substrate. One advantage of this assembly is that the pump-to-EDF loss is well assured by the filter-collimator sub-assembly, resulting in better loss control.

Figure 5:
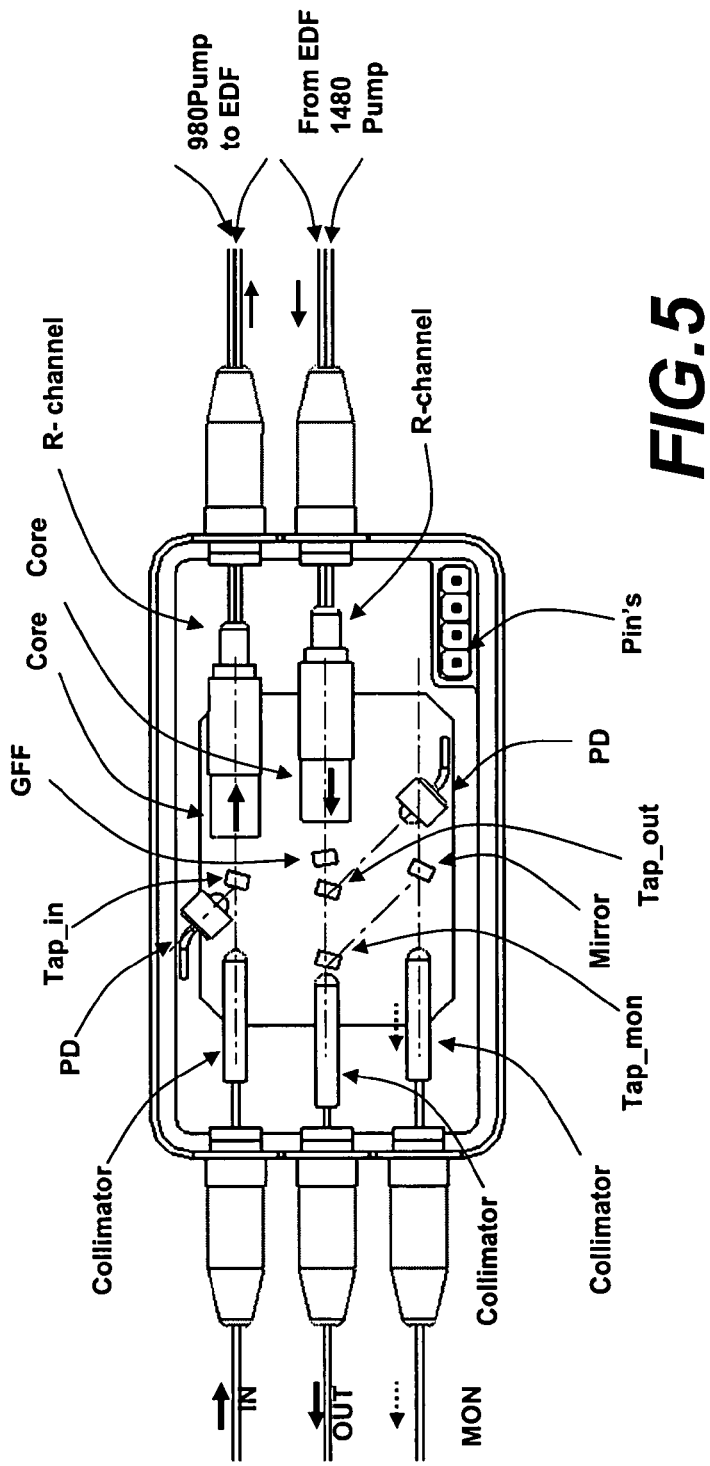
FIG. 5 shows an embodiment including all the passive components and the photo-diodes bonded to a substrate housed in a box.

According to one embodiment as shown in FIG. 5, all the passive components and the photo-diodes are bonded to a substrate that is housed in a box. The I/O fibers and I/O electric PIN's are positioned to connect to an EDF, signal fibers, and external electric circuits. The box dimension is about 45 mm(L)×25 mm(W)×7.8 mm(H) in one embodiment.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claim. Accordingly, the scope of the present invention is defined by the appended claims rather than the forgoing description of embodiments.

We claim:

1. An optical apparatus comprising:
 a first WDM filter that couples a signal and a pump laser beam of a first wavelength to an erbium-doped fiber amplifier where the signal is amplified, wherein the signal and the pump laser beam of a first wavelength are respectively projected onto the first WDM filter from two opposite sides through a free space;
 a first tap projecting a sample of the signal to a first photodiode that converts the sample into an electronic signal;
 a second WDM filter provided to project a pump laser beam of a second wavelength coupled in by a collimator to the erbium-doped fiber amplifier where the once-amplified signal is amplified again;

a gain flattening filter (GFF) provided to enhance the twice-amplified signal;

a second tap coupling a sample of the twice-amplified signal to a second photodiode that converts the sample into an electronic signal; and a substrate on which the first and second WDM filters, the first and second taps, and the gain flattening filter are integrated so that the signal, the once-amplified signal, the twice-amplified signal, the laser beams of the first and second wavelengths are projected to corresponding components through a free space.

2. The optical apparatus of claim 1, further comprising a first isolator core to ensure that there is no reflection of the signal from the first WDM and a second isolator core to ensure that the twice-amplified signal goes in one direction, and where the first and second isolator cores are also integrated in the substrate.

3. The optical apparatus of claim 1, further comprising:
a first collimator; and
the first tap positioned at a small angle to reflect the sample of the signal coupled in by the first collimator to the photodiode.

4. The optical apparatus of claim 3, wherein the first isolator core is provided to ensure that the signal coupled in by the first collimator goes one way to the first WDM filter.

5. The optical apparatus of claim 1, wherein the first WDM filter is provided to multiplex the signal and the pump laser beam of the first wavelength to the erbium-doped fiber amplifier, and the second WDM filter is provided to reflect the pump laser of the second wavelength to the erbium-doped fiber amplifier.

6. The optical apparatus of claim 1, wherein the first WDM filter is provided to multiplex the signal and the pump laser beam of the first wavelength to the erbium-doped fiber amplifier, and the second WDM filter is provided to multiplex the signal and the pump laser beam of the second wavelength to the erbium-doped fiber amplifier.

7. The optical apparatus of claim 1, wherein the first WDM filter is provided to reflect the pump laser of the first wavelength to the erbium-doped fiber amplifier, and the second WDM filter is provided to reflect the pump laser of the second wavelength to the erbium-doped fiber amplifier.

8. The optical apparatus of claim 1, further comprising an enclosed box provided to house the substrate, wherein two optical connectors are provided on the box to lead in the signal and lead out the twice-amplified signal.

9. The optical apparatus of claim 8, wherein the erbium-doped fiber amplifier is located externally, and the box further includes two additional optical connectors, one taking out the signal to be amplified in the erbium-doped fiber amplifier, and the other returning the amplified signal beck back to the box.

10. The optical apparatus of claim 9, wherein the optical apparatus is passive.

11. The optical apparatus of claim 9, wherein all components are bonded to a substrate and are passive.

* * * * *